Feb. 11, 1969    J. C. HOVEKAMP    3,426,941
ADJUSTABLE VERTICAL FEEDER MEANS FOR STACKED ARTICLES
Filed June 14, 1966    Sheet 1 of 7

INVENTOR.
JOHN C. HOVEKAMP
BY Bosworth, Sessions,
Herrstrom & Knowles
ATTORNEYS.

INVENTOR.
JOHN C. HOVEKAMP
BY Bosworth, Sessions
Herrstrom + Knowles
ATTORNEYS.

United States Patent Office 3,426,941
Patented Feb. 11, 1969

3,426,941
ADJUSTABLE VERTICAL FEEDER MEANS FOR STACKED ARTICLES
John C. Hovekamp, Elyria, Ohio, assignor, by mesne assignments, to R. Hoe & Co. Inc., New York, N.Y., a corporation of New York
Filed June 14, 1966, Ser. No. 557,423
U.S. Cl. 221—222
Int. Cl. B65h 3/28, 31/20, 5/18
25 Claims

ABSTRACT OF THE DISCLOSURE

Adjustable, high speed vertical and horizontal feeders for printing presses and other purposes wherein the articles to be printed, or otherwise treated or acted upon, are delivered singly from a feed or supply stack to a pick-off point or station, and to method and means for causing a dwell in the movement of a single article on a continuously moving feeder, and/or of advancing or retracting adjacent individual articles on a continuously moving feeder, relative to each other, in the direction of their travel.

---

The general objects of this invention are to provide a new and improved printing press, to provide new and improved vertical and horizontal feeders for printing presses and other purposes, to provide new and improved vertical and horizontal feeders for delivering a stack of articles, one at a time, to a pick-off or station for printing or other treatment, and to provide new and improved means for causing a dwell in the movement of a single article on a continuously moving feeder containing a plurality of articles and/or of advancing or retracting individual adjacent articles in a continuously moving feeder, relative to each other in the direction of their travel.

Other objects of this invention are the provision of a new and improved vertical feeder for printing presses and other purposes which feeds, releases or deposits articles individually from a stack of similar articles to be printed or otherwise treated or acted upon to a predetermined location, at a predetermined speed and in predetermined sequential relationship with other apparatus with which the feeder is used; the provision of such a vertical feeder which feeds, releases or deposits articles having a predetermined thickness, generally thicker than paper, such as plastic tops for cheese boxes, and the like, individually; the provision of such a vertical feeder which may be easily or readily adjusted, changed and adapted to accommodate, feed, release and deposit, individually, stacks of articles of any of a wide range of thicknesses; and, the provision of such a vertical feeder which feeds, releases or deposits articles, individually, from a stack of similar articles having a circumference which is effectively circular or round, and is readily and easily adjusted to accept, hold, feed, release and deposit articles of any of a wide range of predetermined effective diameters.

Further objects of this invention include the provision of apparatus for feeding, releasing or depositing articles individually from a stack of similar articles having a circumference which is effectively circular or round and is readily and easily adjusted to accept, hold or retain, and feed, release or deposit articles of any of a wide range of predetermined effective diameters which is easily and readily adjusted to closely support and feed, release or deposit such articles over a wide range of diameters; which includes a plurality of stacking guides or hopper posts for supporting the stack of articles within the feeder; which includes a plurality of stacking guides or hopper posts which are maintained substantially in tangential relationship with the articles stacked within the feeder at all times, without regard to the effective diameter of the articles; which includes new and improved apparatus and means by which the stacking guides or hopper posts are maintained tangential to the circumference of the articles to be accepted, held, fed, released or deposited, regardless of the effective diameter of the articles and the particular setting of the feeder within the range of diameter sizes which it is adapted to handle; and, which includes means and structure whereby vertically extending stacking guides or hopper posts for the adjustable feeder are moved in a substantially radial path, relative to the center of the feeder, as the feeder is adjusted over its range in order to maintain the guides in tangential position relative to the articles to be supported therein.

Still other objects of this invention include the provision of a new and improved adjustable vertical feeder for printing presses, and other purposes, having readily changed and interchanged dispensing or releasing means or feed mechanisms for dispensing the articles to be fed, released or deposited from a stack within the feeder, one at a time; the provision of such a feeder in which the dispensing means can be changed and interchanged readily and easily to accommodate articles of varying thickness and styles, provided the styles have an effective circular or round circumference at least at the points which engage the stacking guides or hopper posts and dispensing means; the provision of such a feeder in which a plurality of dispensing means or mechanisms act upon the article to be fed, released or deposited in unison and in proper relative relation with each other; the provision of such a feeder which includes means coacting with the drive mechanism for the vertical feeder whereby the timing of the vertical feeder and of the dispensing means or mechanism is maintained in unison and in proper relative relation with the surface or feeder upon which the vertical feeder dispenses the article from the stack therein; the provision of such a feeder in which the dispensing means or mechanisms and the guide posts are maintained automatically in proper relationship with the effective circumference of the articles to be fed, released or deposited (or the position they will take when in the feeder) at all times during adjustment, and at all positions, of the diameter of the hopper or vertical feeder so that the articles are properly head and supported in the feeder and are properly fed, released and deposited from the feeder in proper sequence and proper position relative to each other and to the apparatus with which the feeder is used; and the provision of such an apparatus in which the timing of the dispensing means or mechanism relative to the center of the articles to be fed, released or deposited is maintained automatically during adjustment of the diameter of the feeder hopper, and in which the point of tangency of the stacking guides or hopper posts and the dispensing means with the articles to be fed, released or deposited, or the point of effective circumference or edge thereof is substantially maintained, automatically during adjustment of the diameter of the feeder hopper for the entire range of diameters which the feeder is adapted to handle.

Still further objects of this invention include the provision of a new and improved horizontal feeder for printing presses, and other purposes, in which pushers are provided to move each individual and respective article to be printed or otherwise acted upon in timed sequence to a pick-off point or station; the provision of such a feeder in which said pushers have a dwell so as to hold the article stationary at the moment of pick-off or delivery to the next station of the apparatus or other apparatus; the provision of such a feeder in which the pushers positively advance and position each individual article to be printed or otherwise acted upon; the provision of such a feeder which is readily adapted to have a plurality of pushers in side by side relationship whereby a plurality of parallel lines of individual articles may be advanced to a plurality of parallel pick-off points or positions to the end that one printing head, or other apparatus, or series of printing heads, or other apparatus, may simultaneously print, or otherwise act upon a plurality of articles to be printed, or acted upon; the provision of such a feeder in which the pushers are automatically timed in relation to the dispensing means of the feeder or other apparatus, if any, which deposits the articles to be conveyed by the horizontal feeder onto the horizontal feeder; and the provision of such a feeder which includes new and improved means for providing a dwell in the travel of a moving pusher in a continuously moving feeder and/or a new improved means by which adjacent pushers, and the respective articles being moved thereby, in a continuously moving feeder are caused to advance or retract relative to each other and in the direction of travel.

Further objects of this invention include the provision of new and improved feeder for printing presses, and other purposes, having pushers for moving the articles to be fed in a predetermined direction, which are driven by an endless chain, belt or the like; the provision of such a feeder which has new and improved means for providing intermittent motion or dwell to the individual pushers and the articles which are being fed thereby, respectively; which has new and improved means for tripping, turning over, and erecting the pushers, whereby the pushers advance the articles to be fed by means of an endless chain and return beneath the surface of the feeder and are re-erected to advance another article in a similar manner; and the provision of such a feeder in which a plurality of articles are advanced in predetermined sequence through the feeder.

Still further objects of this invention are the provision of a new and improved method and means whereby adjacent articles, pushers, or the like, are moved or advanced in a predetermined lineal direction and, while being continuously moved en masse, are caused to advance or retract or have intermittent motion relative to each other and in the direction of travel, and whereby the nature and degree of advancement, retraction or intermittent motion or dwell of adjacent articles is of predetermined length.

Still further objects of this invention include the provision of new and improved feeder, having horizontal and vertical feed mechanisms, whereby a stack of articles to be fed are delivered one at a time to a horizontal pick-off point or position; the provision of such a feeder in which said articles are delivered one at a time to a predetermined pick-off point or position in a dwell so as to facilitate accurate register with the pick-off apparatus; and the provision of such a feeder in which said articles may be of any predetermined diameter, within the range of diameters for which the apparatus is designed.

Other objects of this invention include the provision of a new and improved radially adjustable, vertical feeder for printing presses, and other purposes, for feeding, releasing or depositing articles of predetermined thickness, having a plurality of stacking guides or hopper posts and a plurality of driven dispensing means or mechanisms wherein the said guides or posts and the said dispensing means are in fixed relationship, respectively, and to provide such apparatus for use with a horizontal feeder having pushers for advancing the articles deposited therein, respectively, wherein the change or adjustment of the diameters of the feeder hopper for the vertical feeder does not interfere with the time relationship or relative relationship of the vertical dispensing means with the individual horizontal pushers but rather such time relationship and sequence is properly maintained during adjustment of the vertical feeder and the respective mechanisms of the vertical feeder are also maintained in proper time sequence and relation.

Other objects of this invention include the provision of a new and improved adjustable vertical feeder which is easily, rapidly and economically adjusted; which substantially eliminates human judgment from the feeder adjustment; which adjusts with markedly and unexpectedly greater accuracy than was possible with prior feeders known to the art; which provides great economy by providing an adjustable feeder to take the place of a plurality of fixed feeders; and which provides productive speeds, during operation, three or four times greater than feeders previously known to the art.

Still further objects of this invention are to provide a new and improved printing press, and the like, to provide new improved horizontal and vertical feeders for printing presses, and other apparatus, to provide new and improved mechanism for providing for the respective dwell, or advancement or retraction, of adjacent articles being fed in a lineal direction, relative to each other and relative to the direction of travel, and to provide apparatus of such nature, respectively, obtaining one or more of the objects and advantages set forth above.

Still further objects of this invention include the provision of feeders and apparatus obtaining one or more of the objects and advantages set forth above which are more efficient and effective than feeders for similar purposes previously known and used; which are simple and effective in operation; which have markedly and unexpectedly higher feed rates, on an articles per minute basis, than feeders for similar purposes previously known and used in the art; and which have new and improved means by which articles are delivered, by a continously moving feed mechanism, in a state of dwell to a pick-off point or station to provide improved more efficient register with the pick-off apparatus.

These and other objects and advantages of this invention will appear from the following description of preferred forms thereof, reference being had to the accompanying drawings in which.

Figure 1:
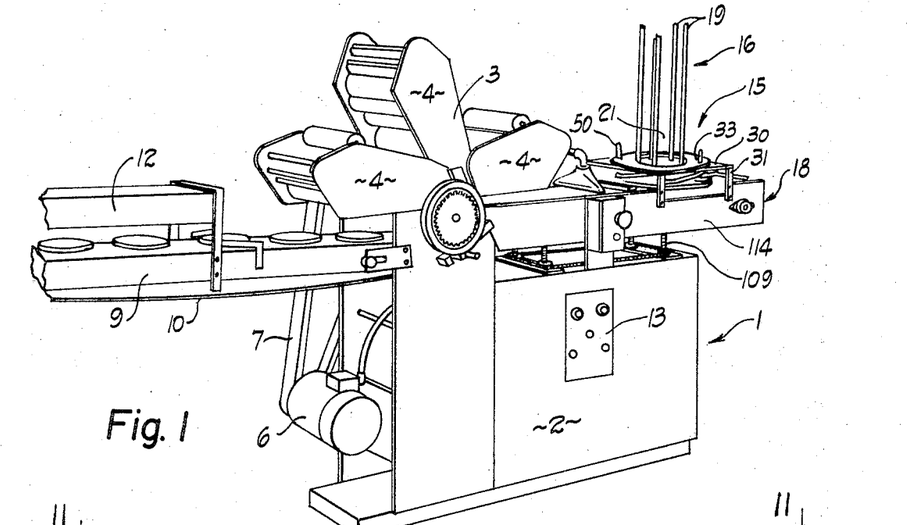
FIGURE 1 is a perspective view of a printing press, including horizontal and vertical feeders embodying preferred forms of this invention.

A printing press, including feeder means embodying this invention, is indicated generally at 1 FIGURE 1, and also, includes a stand 2, for supporting the press, a printing head portion 3, having 1 or more, three shown, printing heads 4, of any conventional type for offset printing, for example. Press 1 also includes a motor 6, which is mounted on stand 2 in a conventional manner and is adapted to drive the printing heads 4 and other apparatus. A conveyor 9, having an endless belt or webbing 10 thereon, is adapted to receive the articles after the same have been printed, or otherwise acted upon, by the printing head portion 3 and convey them from the printing head portion 3, beneath one or more conventional dryers 12, to a stacking or receiving position, not shown. Conveyor 9 is also driven by suitable motor means, not shown. Stand 2, also, conveniently includes a console portion 13 wherein the basic electrical controls for the motor and apparatus are conveniently located.

All of the above is old in the art, and, per se, forms no part of the present invention. Printing press 1 is shown in use with a feeding mechanism, indicated generally at 15, embodying this invention and comprising both a vertical feeder, indicated generally at 16, and a horizontal feeder, indicated generally at 18.

Further, while feeders 16 and 18 are shown embodied in a common feeder 15 and in use with printing press 1, it is to be understood that the feeder 15 and/or feeders 16 and 18, respectively, and/or all or part of the apparatus embodying all or part of this invention may be used with or adapted for use with other apparatus, and other apparatus may be used with or adapted for use with feeder 15, feeders 16 and 18, respectively, all or part of the structure thereof embodying this invention and/or all part of his invention, without departing from the scope and purpose of this invention.

Vertical feeder 16, (FIGURES 1, 2, 3, and 4) includes a plurality of vertically extending angularly (preferably equiangularly) spaced stacking guides or hopper posts 19, five shown, which define a hopper 21 within which the articles to be printed or otherwise acted upon are stacked for feeding, releasing and depositing. Such articles are usually of relatively large thickness compared with paper and the like, such as, for example lids for cottage cheese boxes and similar items, are usually formed of plastic and have a generally round or circular circumference of predetermined diameter, albeit the diameters of a stack of articles to be received in a feeder 16, embodying this invention, may vary over a wide range and, as will hereinafter more fully appear, the hopper 21 is readily and easily adjusted and adapted to receive the same.

Further, while articles to be used with a feeder 16 embodying this invention are usually round or circular in circumference, feeders embodying this invention are adapted to feed articles having effective circular or round circumference, even if they not in fact be round; that is articles having those portions of their edges in contact with the posts 19 (and functional contact with the dispensing means as will hereinafter appear) on a common circle viz-a-viz the center of the hopper 21, even though portions of the edges intermediate the portions having contact and functional contact with the posts 19 and dispensing means are not circular or on said common circle.

Posts 19 not only support the stack of lids or articles to be printed or otherwise treated within the hopper 21, but also guide and direct the stacked articles and, more particularly, the successive articles therein to a proper position relative to the dispensing or releasing means or feed mechanism, indicated generally at 23 (FIGURES 2, 3, 4 and 5.) This purpose and function of the posts is illustrated, by way of example, in FIGURE 4 wherein the post 19 is welded to the plate 24 which is part of the adjusting mechanism, indicated generally at 26, by which the diameter of hopper 21 and the relationship of post 19 and the dispensing means 23 is maintained, relative to the article being fed, as will hereinafter more fully appear. Preferably one dispensing or releasing means or feed mechanism 23 and adjusting mechanism 26 is associated with each post 19 and each is adapted to act in simultaneous cooperation with the other dispensing means 23 to feed, release or deposit one article at a time in proper timed relation and sequence upon the surface to which the vertical feeder is making delivery and the adjusting mechanism 26 is such that this relationship is maintained no matter to what diameter hopper 21 is adjusted, within the range of diameters for which it can be adjusted.

Figure 2:
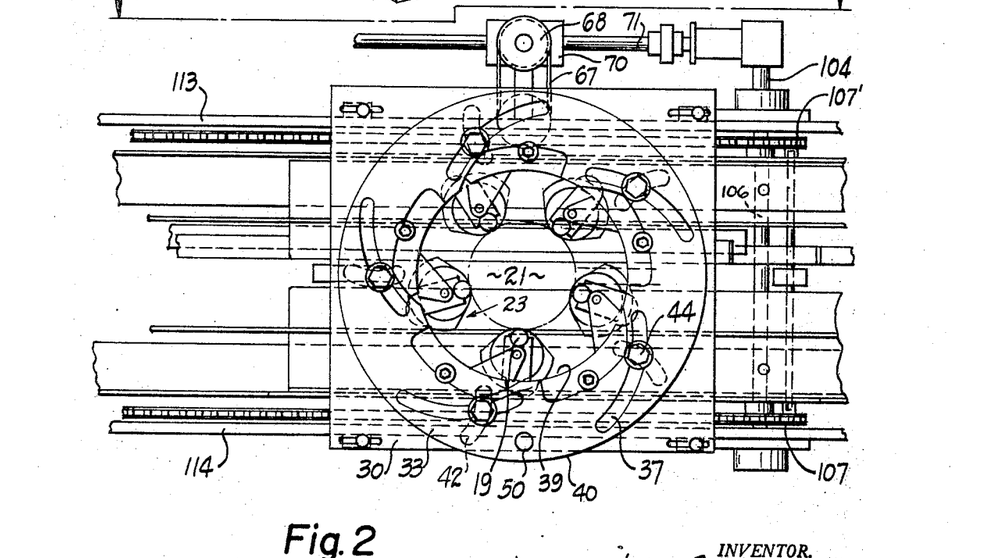
FIGURE 2 is a top plan view of the vertical feeder shown in FIGURE 1.
Figure 3:
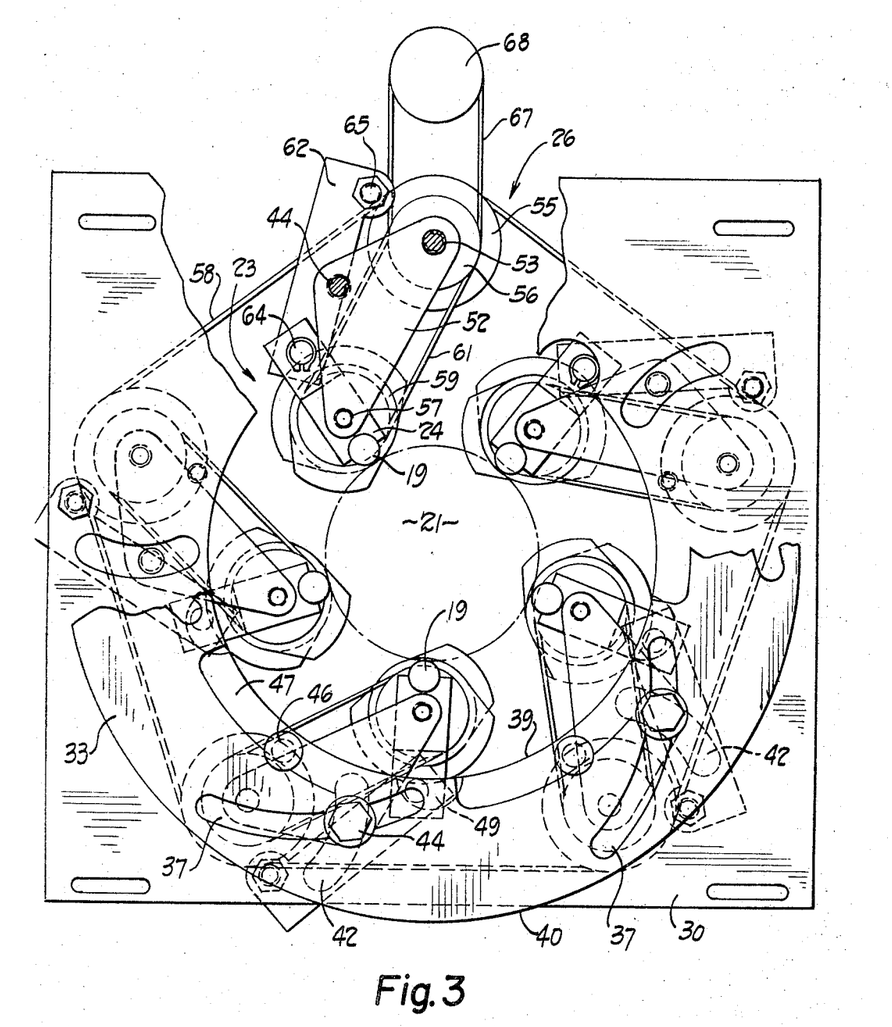
FIGURE 3 is an enlarged top plan view of the feeder shown in FIGURE 2, broken away for clarity of understanding.
Figure 4:
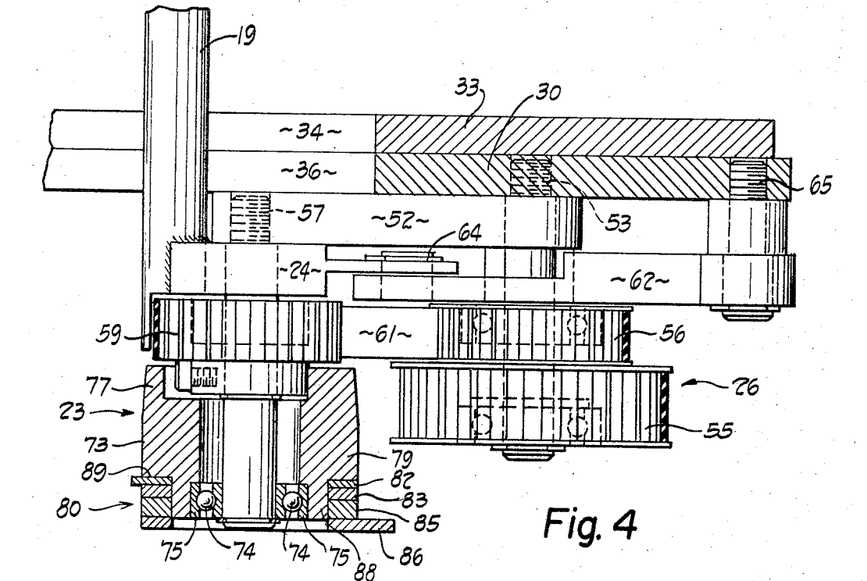
FIGURE 4 is a side view of the vertical feeder adjusting and feeding mechanism.

As best seen in FIGURES 2, 3 and 4, vertical feeder 16 includes a base or support plate 30, which is mounted by suitable supports 31, see FIGURE 1, on the sides of the horizontal or conveyor feeder 18 and at a point intermediate the length thereof. Plate 30 is conveniently square and of sufficient size and strength to support the entire feeder 16 and the articles to be supported therein and the mounting of plate 30 by supports 31 ensures a proper space relationship between the feeder 18 and the center of the hopper 21 and the articles to be delivered by feeder 16 to feeder 18.

Vertical feeder 16 also includes a second or adjusting plate 33 which is conveniently circular, as shown. Plates 30 and 33 have central apertures, 34 and 36, respectively, having diameters equal to or slightly larger than the maximum diameter of the largest size article or lid to be dispensed from the feeder 16. Adjusting plate 33 is mounted for rotation on and relative to plate 30 and, as it is rotated, it causes adjustment of the diameter of hopper 21. To this end, plate 33 is provided with a plurality of arcuate slots 37, having shape and direction substantially as shown, see FIGURES 2 and 3, and extending generally from near the inner edge 39 of plate 33 toward the outer edge 40 thereof. Plate 30 is also provided with a plurality of slots 42, which extend in a more generally radial direction than slots 37 and have an over-all radial length substantially equal to the radial distance between the inner and outer ends of slots 37, respectively. The radial length of slots 37 and 42 depends on the range of adjustment with which the particular feeder is provided, as will hereinafter more fully appear.

The number of slots 37 and 42 in plates 33 and 30, respectively, are equal in number to the number of posts 19, dispensing means or feed mechanisms 23 and adjusting mechanisms 26 provided, and the plates 30 and 33 are so positioned and the slots so located and sized that their paths intersect or overlap during relative movement with an area sufficient to receive a crank 44 which extends through both slots to and for the purposes which will hereinafter more fully appear.

The motion and relative motion of plate 33 viz-a-viz plate 30, acts and co-acts with the crank 44 to drive the adjusting mechanism 26 and change the diameter of hopper 21, while the crank 44 because of engagement in both slots 37 and 42, also, helps maintain the plate 33 (depending on the tolerances of the slots, respectively, and the crank) in proper position on and relative to the fixed plate 30.

The plate 33 is also maintained, held in position and guided in its movement on plate 30 by a plurality of arcuately spaced guide pins 46, which are fixedly mounted on plate 30 and extend upwardly into guideways 47 in plate 33. Guideways 47 preferably are, in all or part, merely cutaway portions in the inner edge 39 of plate 33 and the cutaway portions are thus adapted to receive the posts 19 so that the diameter of hopper 21 may be larger, by the diameter of posts 19, than the nominal diameter of aperture 36 because the posts 19 are recessed into the plate 33 and into similar cutaway portions or notchs 49 in plate 30 when the hopper is adjusted to have its maximum diameter.

Thus, plate 33, may be rotated back and forth relative to plate 30 and, as it rotates, it causes the crank 44 to be displaced inwardly or outwardly relative to the center of the hopper 21 and, therefore, to the center of the articles to be dispensed. If the plate 33 is rotated counterclockwise, for example, crank 44 moves outwardly and thereby enlarges the diameter of the hopper 21 to receive articles of greater diameter. Movement of plate 33 in a clockwise direction, on the other hand, reduces the diameter of the hopper 21. The hopper is set before being loaded to loosely, but closely receive the articles so as to guide their path and hold them within the hopper without restricting the action of gravity in drawing them downwardly through the hopper as the successive lowermost articles are dispensed from the feeder.

Plate 33 is turned or adjusted by any suitable and convenient means, such as upstanding handles 50, FIGURES 1 and 2, which are conveniently mounted at diametric positions on plate 33.

Figure 5:
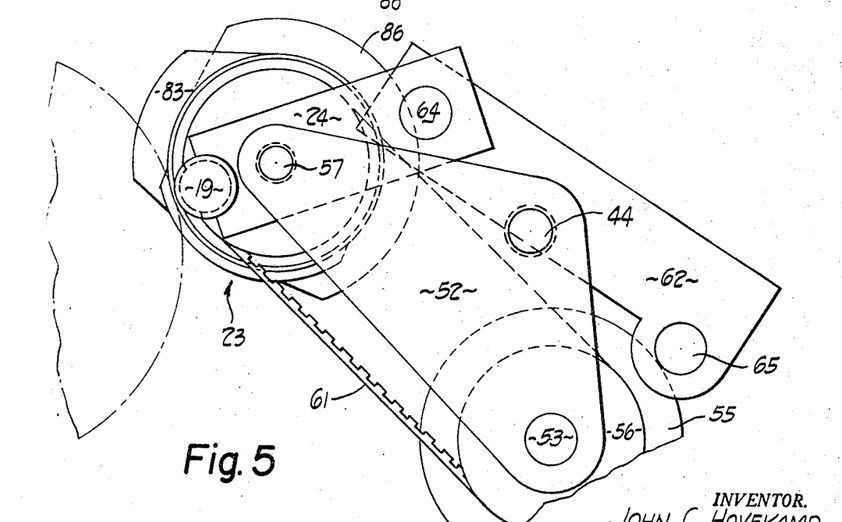
FIGURE 5 is a top plan view of the vertical feeder adjusting and feeding mechanism with the support and adjusting plates removed.

Crank 44 is mounted on crank arm 52, which is conveniently of triangular shape, as shown, FIGURES 3, 4 and 5. Crank arm 52 is rotatably mounted on a pivot or shaft 53 which is, in turn, mounted in a fixed position on the underside, as viewed, of plate 30. Pivot 53 also supports and has rotatably mounted thereon first and second timing pulleys, spur gears or sprockets, 55 and 56, respectively, which are adapted to rotate together about pivot 53 so that pulley 56 is turned by pulley 55 which is driven in timed relation and unison with each of the other similar pulleys 55, one for each post 19, by a timing belt or other suitable means 58, FIGURES 3 and 4.

A floating pivot or axle 57 is supported on crank arm 52 in spaced relation (at the other corner of the triangle, as viewed) with crank 44 and pivot 53. Floating pivot 57 rotatably supports plate 24, upon which post 19 is mounted, as well as a third timing pulley, spur gear or sprocket 59. Pulley 59 is rotatably mounted on pivot 57 and turns with dispensing means 23. Pulley 59 and, therefore, dispensing means 23 is rotated in proper timed relation with the other dispensing means 23 and the apparatus in general by means of timing belt 61 which extends between pulleys 56 and 59 and transmits the motion of pulley 56, induced via timing belt 58 and pulley 55 to the dispensing means 23.

Since pivots 53 and 57 have fixed positions with and on crank arm 52, the distance therebetween is constant at all times, before, during and after adjustment of the adjusting mechanism 26 with the result, in view of the fact that all adjusting mechanism 26 are moved together and in the same direction at a uniform rate and distance, that the movement of all of the dispensing means 23 remains in proper timed relation and sequence relative to each other and the rest of the apparatus in general when the hopper diameter 21 is adjusted.

Adjusting mechanism 26, also, comprises, in addition to crank arm 52, necessary elements to complete what is essentially a parallelogram including crank arm 52, support plate 24, rotatably mounted therewith and thereon, and link 62, which is rotatably mounted on the end of plate 24 remote from post 19 by means of floating pivot or axle 64, and is rotatably mounted on plate 30, which forms the fourth side of the parallelogram, by means of a fixed axle or pivot 65.

Thus, post 19 and dispensing means or feed 23 are moved as set forth above in a predetermined path determined by the length and location of the sides of a parallelagrom defined by fixed pivots 53 and 65 and floating pivots or axles 57 and 64 and the length of the fixed distances therebetween, as determined by the position of pivots 53 and 65 on plate 30, the distance on crank arm 52 between fixed and floating pivots 53 and 57, respectively, the distance on plate 24 between pivots 57 and 64 and the distance on link 62 between floating and fixed pivots 64 and 65, respectively, and as guided by crank 44 in slots 37 and 42 of plates 33 and 30, respectively. Also, slot 42 has a radius equal to the radius or distance between pivot 53 and crank 44 so that the crank does not bind in the slot during adjustment of hopper 21 and movement of crank 44. Further, the distance between pivots 64 and 65 is preferably somewhat less than the distance between pivots 53 and 57 in a hopper designed to handle articles up to about 8½ inches in diameter, so that the resultant motion keeps post 19 tangential with the edge or periphery of the article more easily over the range of sizes which the apparatus is designed to handle.

Further, in order that the post 19 and dispensing means or feed mechanism 23 are held in position, once adjusted in accordance with the effective diameter of the articles to be fed, released or deposited by feeder 16, crank 44 conveniently comprises a bolt having a threaded engagement with crank arm 52, so that the crank arm 52 and plate 33 can be drawn toward each other and against plate 30 when the hopper 21 is in proper adjustment, but can be loosened, to permit activation and operation of the adjusting mechanism 26 when and as necessary. Further, while only one mechanism 26 has been described in detail, it is to be understood that each of the plurality used, 5 shown by way of example, is similar and all are interconnected and driven in unison to and for the purposes and by the means set forth above, by the single timing (and driving) belt 58, which circumscribes and engages the periphery of each of the pulleys 55.

Thus, since each of the pulleys 55, 56 and 59, respectively, is of the same size and since each of the timing belts 61 is of the same length, all of the dispensing means or feed mechanisms 23 rotate at the same speed and in unison and in similar relative rotational position relative to each other, to the feeder in general, to the center of the hopper 21 and to the article to be fed. Timing belt 58 is in turn driven by a master timing belt 67, which engages a pulley not shown, on one of the fixed posts or pivots 53, FIGURES 2 and 3, and is itself driven by pulley 68 mounted on and driven by gear box 70 which is driven by shaft 71, which is, in turn, driven through a connection, not shown, by motor 6.

Figure 7:
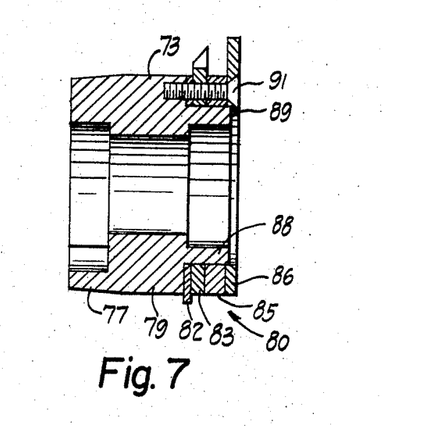
FIGURE 7 is a sectional view taken along the line 7—7 of FIGURE 6.
Figure 8:
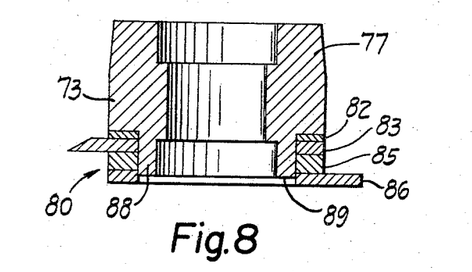
FIGURE 8 is a sectional view taken along the line 8—8 of FIGURE 6.

Dispensing or releasing means or feed mechanism 23 preferably comprises a body member 73, mounted by suitable means, such as ball bearings 74 and supports 75, FIGURE 4, on pivot 57, and having a slightly truncated upper portion 77, FIGURES 4, 7 and 8, to provide a smooth transition and guidance for the articles in the hopper 21 as they pass, under the influence of gravity, from the confines of the posts 19 to the zone of the feeder within the dispensing means 23. The diameter of the circle within the confines of the main or cylindrical portions 79 of bodies 73 is substantially equal to but just slightly larger than the diameter of the articles to be fed, released and deposited from the feeder 16 so as to properly guide the articles to the dispensing portion, indicated generally at 80, of dispensing means 23, without however, interfering with the action of gravity in bringing the successive articles into functional engagement with the dispensing portion 80.

Figure 6:
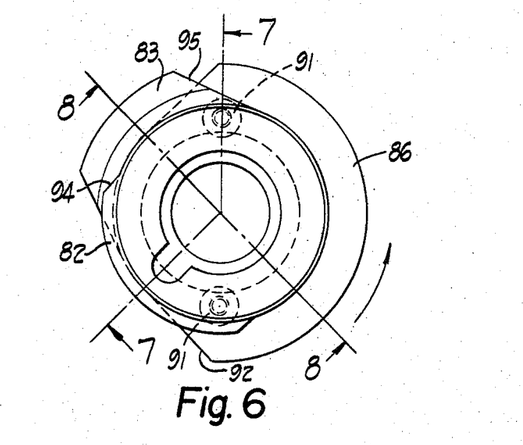
FIGURE 6 is a top plan view of a preferred form of despensing means embodying this invention.

Dispensing portion 80, FIGURES 6, 7 and 8, comprises a plurality of annular ring members 82, 83, 85 and 86, respectively, which are mounted on and circumscribe a lower necked portion 88 of body member 73 and are held in place against shoulder 89 by screws 91.

Figure 15:
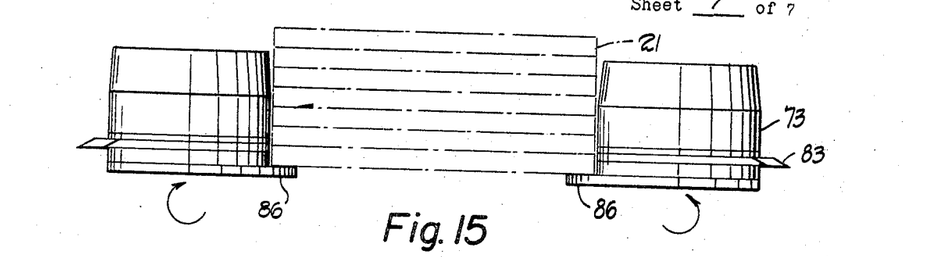
FIGURES 15, 16 and 17 are schematic elevations of the dispensing means shown in FIGURES 6, 7 and 8 illustrating the operation thereof.
Figure 16:
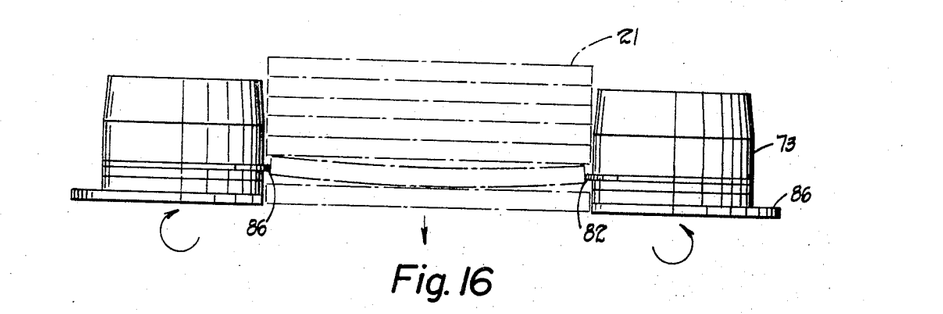
Figure 17:
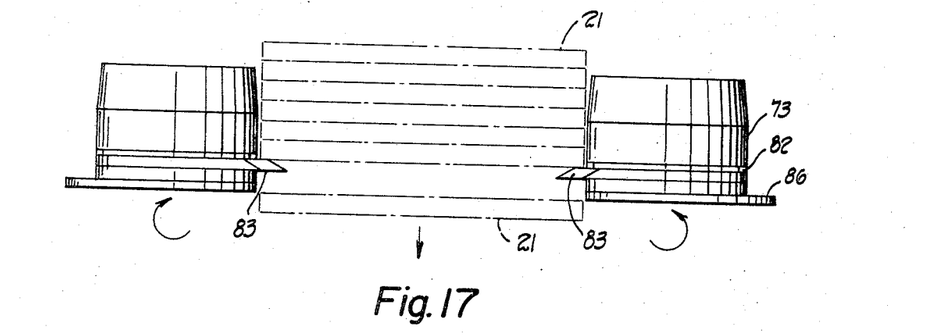

Dispensing means 23 function, as can be seen in FIGURES 6, 7 and 8 and 15, 16 and 17, sequentially by first supporting the edges of the next article to be fed, released or dispensed from feeder 16 on the lowermost or support ring 86, FIGURE 15, and then as the body member 73 rotates counterclockwise, squeezing the penultimate article to be fed to compress it radially and hold it in the hopper 21, between the body members 73, by means of squeezing ring 82, FIGURE 16, while the lowermost article having passed the trailing edge 92 of support ring 86 drops, under the influence of gravity, onto the discharge area, feeder 18, in this instance. Knife edge or separator ring 83, FIGURE 17, then passes under and catches what was the penultimate article, but is now the lowermost article, supporting the stack while the compressive force of ring 83 (actually of each ring 83 in each feed tooling 23 since all are timed to act simultaneously and in unison on the articles to be fed, released and deposited respectively) is released by the passage of trailing edge 94 of ring 82. Knife edge or separator ring 83 also separates and/or forces the lowermost article downwardly, to positively dispense the same, should there be any tendency of the article to stick in the hopper or adhere to the penultimate article and not separate fully or quickly enough under gravity alone.

Once the trailing edge 95 of ring 83 passes, the entire stack settles downwardly, due to gravity, and the new lowermost, previous penultimate, article is supported on the ring 86. The thickness of spacer ring 85 is substantially equal to the thickness of the articles to be fed, released or deposited from the feeder 16. Further, dispensing means 23 is readily and easily adjusted to accommodate articles of different thicknesses, in accordance with the precepts and purposes of this invention, by removing the ring 85 and substituting therefor a ring of different thickness, in which instance a second spacer ring is disposed about neck 88, either above ring 82 or below ring 86, to fill up the remaining length of neck portion 88 of body member 73. And, of course, the range of article thickness over which dispensing means 23 may be adjusted and adapted to function can be markedly increased by increasing the length of neck portion 88 (extending it upwardly, as viewed) over a greater length of body member 73 and using one or more spacer rings 85 both between rings 83 and 86 and above ring 82 or below ring 86, in order to fill in the entire length of the necked portion 88, as required in view of the length thereof and the thickness of the particular articles being fed.

Figure 9:
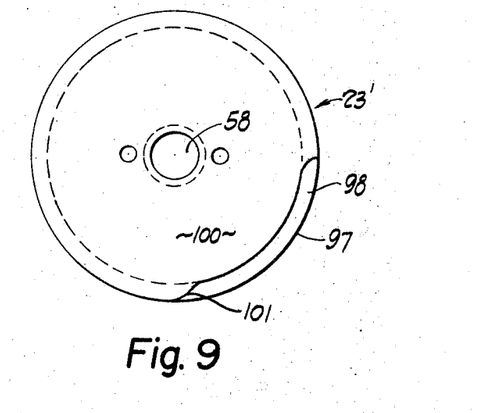
FIGURE 9 is a plan view of another form of dispensing means usable in apparatus embodying this invention.
Figure 10:
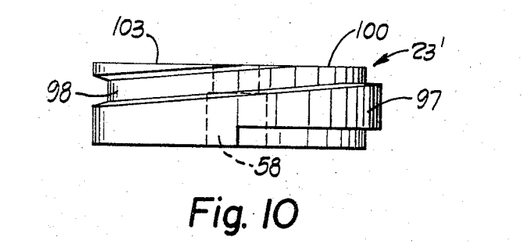
FIGURE 10 is a side view of the dispensing means shown in FIGURE 9.

FIGURES 9 and 10 disclose an alternate form of dispensing or releasing means or feed mechanism 23' comprising a body member 97 having a screw thread 98 thereon, which is well-known in the art and which may be used to positively separate and release the lowermost article in the stack. The pitch of thread 98 is equal to the height of the article to be fed, the body member 97 is mounted on pivot 58 and each successive article is pulled by gravity into thread 98 at the upper end 100 thereof while the leading edge 101 separates the lowermost article from the penultimate article, which is then supported on the topmost thread 103.

Of course, with the preferred form of dispensing means 23, the articles are acted upon by the dispensing means in the manner set forth above at a point substantially in vertical alignment with the posts 19, respectively, and with the alternate form of dispensing means 23' each article enters thread 98 at point substantially in vertical alignment with the posts 19, also.

Drive shaft 71 also drives connecting shaft 104 and thence, via gearbox 105, shaft 106 which extends transversely of horizontal feeder 18 and has mounted thereon for rotation therewith transversely spaced sprocket wheels 107 and 107' which drive the horizontal feeder 18, as will hereinafter more fully appear.

Thus vertical and horizontal feeders 16 and 18, respectively, are in proper coordinated relationship so that the feed of each article or lid, as it is dispensed from the vertical feeder 16, will be deposited in proper position on the horizontal feeder 18, so that only one article or lid is delivered at a time to the pick-off point in any linear row of articles being delivered and so that the feeders are maintained in unison and in proper timed relationship as the motor is speeded up or slowed down at the discretion of the user. Further, the nature and structure of the feeders 16 and 18, respectively, embodying this invention are such that as many as 800 articles, such as package lids having a recessed top (similar to those commonly used on cottage cheese, cheese dip and other items), are delivered seriatim and in a state of dwell to the pick-off point per minute, for each vertical feeder 16 and each lineal row of articles on horizontal feeder 18.

Horizontal feeder 18 comprises a base plate 108 which is supported on stand 2 by suitable adjustable threaded supports or screws 109. Supports 109 are conveniently driven in unison by chain 110, FIGURE 11, by means of gear 111 and handle 112 so that the base plate is held in position, horizontally, while being readily and easily adjusted vertically to raise and lower the entire feeder 18 so that the top of the articles being conveyed or fed to the pick-off point or station will be in the same vertical plane, regardless of the thickness of the articles themselves.

Figure 12:
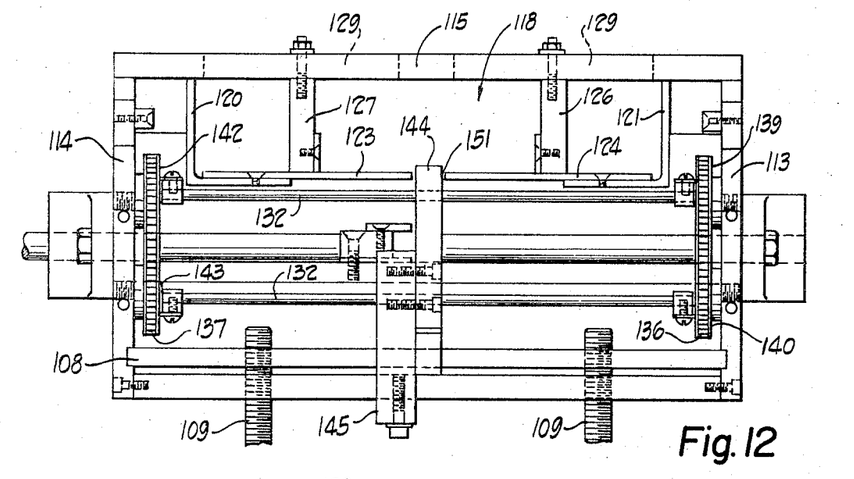
FIGURE 12 is a front elevation of a horizontal or conveyor feed mechanism embodying a preferred form of this invention.
Figure 13:
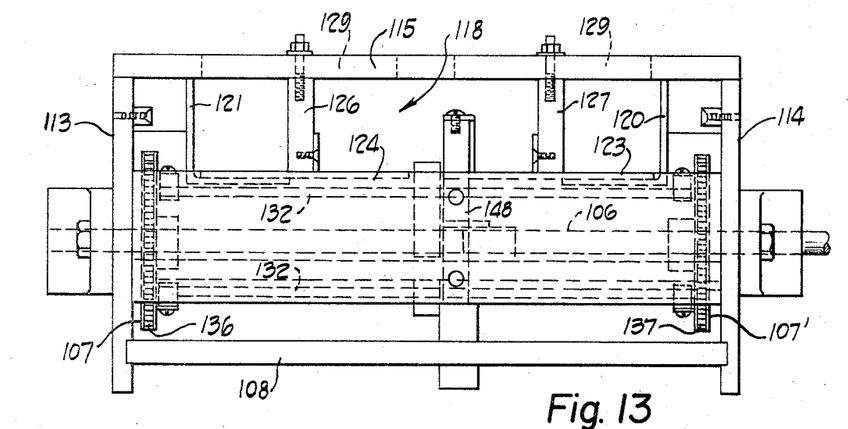
FIGURE 13 is rear elevation of the horizontal conveyor feed mechanism shown in FIGURE 12.

Horizontal feeder 18 also comprises side members 113 and 114, respectively, FIGURES 12 and 13, which are adapted to slide on base plate 108 so that the feeder 18 is easily and readily pushed into and pulled out of position to deliver the articles to the pick-off position, for servicing, adjustment or other reasons. A suitable lock, not shown, holds the feeder in place when the same is pushed into the normal operative position, as in FIGURE 1. A plurality of tie bars 115 and a central tie plate member 117 extend between the upper edges of sides 113 and 114 to hold the same in a position, provide a rigid whole and to cooperate with and function as a part of the feed mechanism, as will hereinafter more fully appear.

Figure 11:
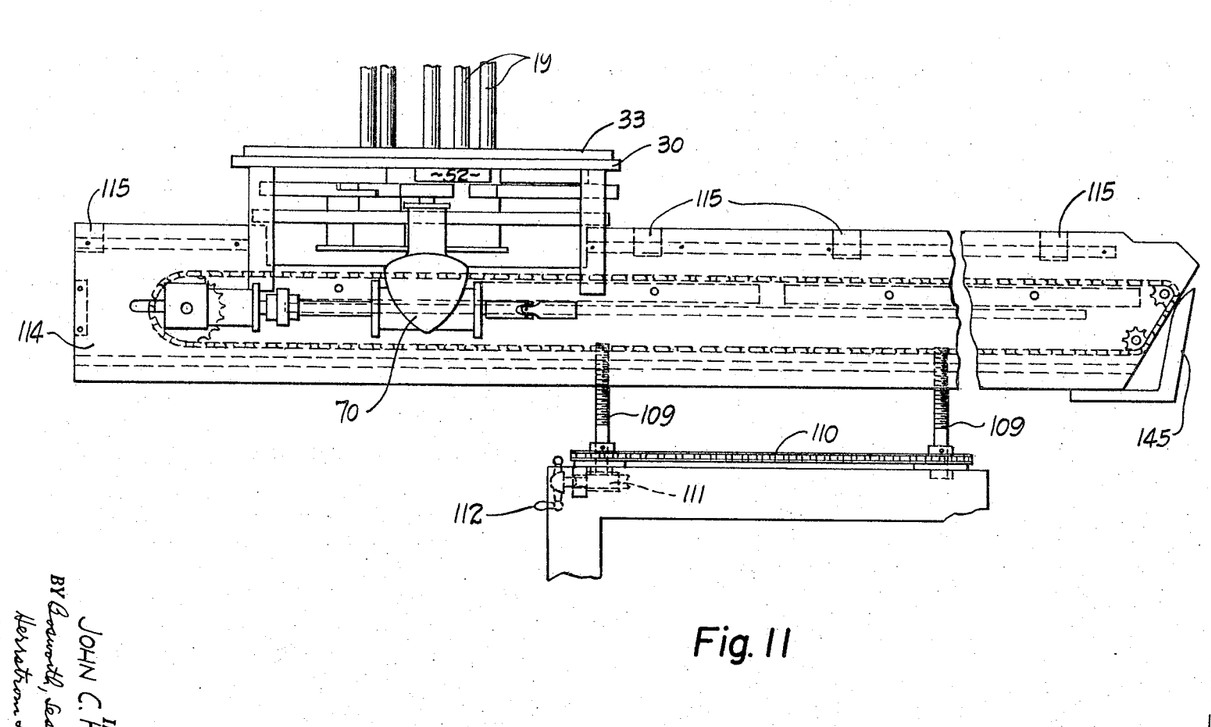
FIGURE 11 is a side view, partly schematic, taken along the line 11—11 of FIGURE 2.

Tie bars 115 have suspended therefrom the article cage, indicated generally at 118, within which the articles are confined as they are advanced through the feeder 18 from the point of reception from feeder 16 to the pick-off point at the fore end, rightward end, as viewed in FIGURE 11, of feeder 18.

Cage 118 comprises angle irons 120 and 121 extending longitudinally at each side of feeder 18 and supporting plates or deck member 123 and 124, respectively, upon which the articles being fed ride and by which they are directly supported while in feeder 18. In addition, cage 118, also, comprises left and right side guides 126 and 127, respectively, which are adjustable laterally in and out, in suitable slots 129 in tie bars 115, for positioning in accordance with the diameter of the articles being conveyed through the feeder. Cage 118 has a height somewhat greater, as desired, than the thickness of thickest articles to be conveyed and guides 126 and 127 are so arranged as to snugly engage the articles adjacent the pickoff point so that they do not coast at the end of their travel, but are at rest at the pick-off point.

Figure 14:
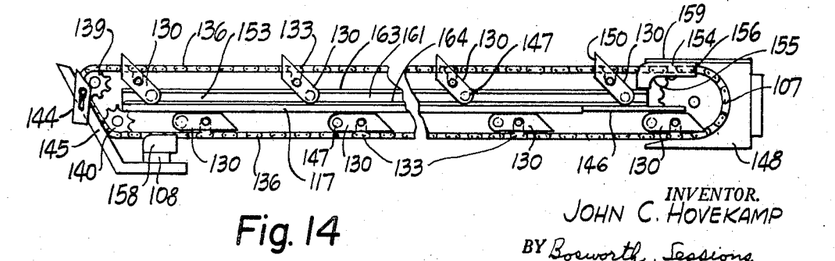
FIGURE 14 is a diagrammatic, longitudinal section showing the operation of the horizontal or conveyor feed mechanism shown in FIGURE 12 including the apparatus for providing a dwell to successive articles at the pick-off point and/or advancing or retracting successive articles relative to each other and the direction of travel.

The articles are conveyed through feeder 18, individually, by means of a plurality of pushers 130, FIGURE 14, each of which engages behind an article as it is deposited on decks 123 and 124, beneath vertical feeder 16, and pushes it to the pick-off position overhanging the forward end, leftward end as viewed in FIGURE 14, of feeder 18 in a position of dwell.

Each pusher 130 is rotatably mounted on a transversely extending shaft of pusher rod 132, which is supported at each end by links 133 which are in turn rigidly mounted on chains, or similar endless drive means, 136 and 137, respectively. Chains 136 and 137 are mounted on and driven by sprockets 107 and 107', respectively, at the rearward end of feeder 18.

Conveyor chains 136 and 137 pass over and are supported by upper and lower front sprocket wheels 139 and 140 and 142 and 143, respectively. Lower front sprockets 140 and 143, respectively, are slightly to the rearward of upper front sprockets 139 and 142, respectively, in order to give the pushers 130 both a downward and rearward motion as they are carried away from the pick-off point by pusher rods 132, respectively.

Further, in order to bring each article to a dwell as it reaches the pick-off point, a cam 144, mounted on support 145 which is in turn secured to plate 108, is provided in the path of travel of the pushers 130 to engage the pusher 130 successively and rotate them clockwise, as viewed in FIGURE 14, about their respective shafts 132 to separate each pusher from the article being pushed thereby and bring the article to a stop or dwell as pushing ceases and the article is squeezed between the side guides 126 and 127. Further advancement of the pushers 130 is also halted because the length of links 133 is equal to the radius of the sprockets 139 and 142. Thus, once each shaft 132 is aligned with the axis of the said sprockets and the links are positioned to cause this alignment, the shaft 132 and respective pusher 130 remain motionless at the center of the sprockets while the links 133 advance around the sprockets with the chains 136 and 137, respectively, and until the links 133 begin their downward travel toward the lower sprockets 140 and 143, respectively. Thus, while shaft 132 remains on the axis of sprockets 139 and 142 it does not move and so the pushers mounted thereon also remain stationary. The length of the dwell can be varied by increasing or decreasing the radius of the sprockets and during the dwell the next succeeding article advances relative to the stationary article and until the next apparatus picks-off the stationary article at the pick-off point. Further, adjacent articles may be either advanced or retracted relative to each other by using links on the chains which extend radially, in terms of sprockets 139 and 142, in or out (for narrowing or increasing the gap between adjacent articles, respectively), as an article will then move either slower or faster than the chains which ultimately provide its motive power. Note, also, that the conveyor or drive chains are moving continuously and at fixed or, at least, predetermined speed, during the dwell or other relative movement between adjacent articles. Thus, an article is brought to a standstill or dwell in a feeder embodying this feature of the invention even through the feeder itself be in continuous operation and the drive chain or similar means be moving continuously.

The operation and sequence of operation of the pushers 130 is best understood by reference to FIGURE 14.

Starting at the lower center pusher 130 travels along beneath central tie plate 117 toward the rear of the apparatus, being held in the position shown by the plate 117.

As pusher 130 approaches the rearward end, rightward end as viewed in FIGURE 14, of its travel, the chains 136 and 137 go around sprockets 107 and 107', respectively, carrying pusher rod 132 with them, thereby lifting the pusher up and over plate 117 and, more particularly, a projection or finger 146 extending longitudinally therefrom. At the same time, cam follower 147, rotatably mounted at one end of pusher 130 and extending therefrom, into the paper as viewed, engages cam 148, which thereby rotates the pusher to erect the same and ensure that the pusher's upper and leading edge 150 is perpendicular and thus properly positioned for engaging an article, as shown.

Further, pusher 130 is maintained in proper erected position, as it advances across feeder 18, with its leading edge perpendicular and extending above decks 123 and 124 through slot 151 defined thereby, FIGURE 12, by means of cam follower 147 engaging and traveling within track, guideway, or longitudinal cam 153 and cam follower 147 is positively positioned and located within the guideway 153 by cam 154. Cam 154 is turned upward, or counterclockwise, as viewed, by the pusher rod 132 engaging against surface 155 whereupon end 156 of cam 154 strikes the cam follower 147 and directs it into guideway 153. A spring, not shown, returns cam 154 to the position shown, once pusher rod 132 passes and cam follower 147 has been properly seated in guideway 153. Guideway 153 conveniently extends for substantially the entire length of feeder 18 and terminates just rearwardly of the forward end of the feeder so that the travel of the pusher 130 may be stopped when it has properly located the article being moved thereby, at the exactly correct position for pick-off, a position wherein preferably over one half of the article is supported on the cage deck at the time of pick-off and wherein the clockwise rotation of the pusher induced by cam 145 will not be prevented by cam follower 147 being disposed in guideway 153.

Once the dwell of pusher rod 132, and, therefore, of pusher 130, is completed, the pusher advances downwardly and rearwardly around, in essence, lower sprockets 140 and 143 and, as the pusher starts rearwardly, the lower half of pusher 130 (or cam follower 147) strikes cam 158, which rotates the pusher clockwise thereby clearing the next pusher approaching the pick-off point and tucking the pusher beneath plate 117, and the cycle is repeated.

A stop 159 prevents cam 154 from rotating in the wrong direction and the action of cam 144 and the dwell caused by the pusher rod 132 and the link structure, viz-a-viz the diameter of the upper forward pulleys, ensures that each article is positively positioned in the same position for pick-off.

The distance between adjacent pushers is sufficient to receive the largest diameter article for which the apparatus is designed.

Guideway 153 conveniently comprises a laterally opening U-shaped member comprising a base 161 and upper and lower plate members 163 and 164, respectively.

By way of example, a vertical feeder 16 adapted to hold articles, such as lids having a diameter of from 1 inch to 8½ inches with the posts 19 within the confines of apertures 34 and 36, may have a distance between pivots 53 and 57 of 3.7 inches, between pivots 57 and 64 for 1½ inches, between pivots 64 and 65 of 3⅝ inches and between pivots 65 and 53 of 1½ inches, with the center of a ⅝ inch post being ¾ inches from pivot 57. In addition, the distances between pivots 53 and 57 and crank 44 are 2 inches and 2½ inches, respectively. Slots 37 and 42 have a width of .51 inch with slot 42 having a radius of 2 inches. Slot 37 has the center of its inner and outer ends on circles having radii, relative to the center of the hopper, of 4¾ inches and 6⁷⁄₁₆ inches, respectively, and has a radius of 4.625 inches with its center on a circle of 2.5 inches diameter, relative to the center of the hopper, and on a radius of the hopper at an angle 72° clockwise of the hopper radius through the center of the inner end of the slot. In fact, when 5 posts 19 and mechanisms 23 and 26 are provided in accordance with the preferred embodiment of the invention, the center of the inner end of each slot 37 is preferably on the same radial line of the hopper 21 as the center of the axis from which the radius of the next preceding slot 37 is drawn.

Modifications, changes and improvements to the preferred forms of this invention herein particularly illustrated and described may occur to those skilled in the art who come to understand the principles and precepts thereof. Accordingly, the scope of the patent to be issued herein should not be limited to the particular embodiments of the invention herein depicted and described, but by the advance by which the invention has promoted the art.

I claim:

1. An adjustable vertical feeder for printing presses and other purposes comprising support plate means having aperture means therein, a plurality of angularly spaced guide member means extending vertically through said aperture means, adjusting means comprising spaced fixed axes mounted on said plate means and supporting spaced floating axes nearer the center of said plate means than said fixed axes, respectively, the number of said adjusting means being equal to the number of said guide member means and a guide member means being supported on each said adjusting means, support means for supporting dispensing means on each said adjusting means and mounted for rotation on and with a said floating axis, each said guide member means guiding an article into functional relationship with said support means of the same said adjusting means, crank means on each said adjusting means for rotating said means back and forth about said fixed axes, means to actuate all of said support means in unison and in timed sequence with each other regardless of the diameter between said guide member means.

2. The apparatus according to claim 1 in which dispensing means is mounted on each said support means for rotation therewith.

3. The apparatus according to claim 2 in which said guide member means guide the articles to be dispensed by said feeder into functional engagement with said dispensing means, respectively.

4. The apparatus according to claim 1 in which said adjusting means comprises two said fixed axes and two said floating axes and includes a plurality of linking means respectively linking each fixed axis with a said floating axis and said floating axes with each other, said linking means being pivotally mounted on said axes, respectively.

5. The apparatus according to claim 4 in which each said guide member means is supported on an extension of the linking means between said floating axes.

6. The apparatus according to claim 4 with crank means carried on one said linking means for rotating said adjusting means.

7. The apparatus according to claim 6 in which said support plate means has a plurality of arcuate slot means, equal in number to the number of crank means, and a said crank means extends through each said slot means.

8. The apparatus according to claim 7 in which second plate means is mounted on said support plate means for rotation relative thereto and said second plate means has central aperture means in alignment with said aperture means of said support plate means.

9. The apparatus according to claim 8 in which said second plate means has a plurality of slots, equal in number to the number of crank means, and a said crank means extends through each said slot means in said second plate means.

10. The apparatus according to claim 9 wherein each said respective slot means in said support and second plate means, respectively, have effective intersection only at said crank means whereby rotation of said second plate means actuates said crank means to actuate said adjusting means.

11. The apparatus according to claim 10 including means to rotate said second plate means.

12. The apparatus according to claim 9 in which at least one said crank means comprises bolt means and is tightened into said linking means, respectively, to draw said linking means and support and second plate means together to maintain said adjusting means in a predetermined adjusted position.

13. The apparatus according to claim 10 with a plurality of notch means, equal in number to the number of guide member means, in each said plate means to receive said guide member means, in each said plate means to receive said guide member means when said guide member means are adjusted to have a maximum diameter therebetween.

14. The apparatus according to claim 8 with guide means mounted on said support plate means and engaging said second plate means to guide and maintain said second plate means in position on said support plate means.

15. The apparatus according to claim 1 with first pulley means mounted on a said fixed axis and second pulley means on said floating axis with said support means, in each said adjusting means, timing belt means interconnecting said first and second pulley means of each said adjusting means, other timing belt means interconnecting said first pulley means of each said adjusting means, respectively, and means driving said other timing belt means whereby all said support means are rotated in unison and timed sequence without regard to the adjustment of said adjusting means.

16. The apparatus according to claim 4 with first pulley means mounted on a said fixed axis and second pulley means on said floating axis with said support means, in each said adjusting means, timing belt means interconnecting said first and second pulley means of each said adjusting means, other timing belt means interconnecting said first pulley means of each said adjusting means, respectively, and means driving said other timing belt means whereby all said support means are rotated in unison and timed sequence without regard to the adjustment of said adjusting means.

17. The apparatus according to claim 16 in which said crank means is on said linking means between a said fixed axis and said floating axis with said support means.

18. A dispensing means for supporting a stack of articles in a vertical feeder, and the like, and dispensing them one at a time, said dispensing means comprising a body member for mounting on a driven shaft, and a plurality of separate ring member means detachably mounted on said body member, one said ring member means supporting said stack of articles and releasing the said support in timed sequence to dispense the lowermost said article, a second said ring member means for squeezing the penultimate article of said stack and retaining it in said stack when the lowermost article is released, and at least one spacer ring of predetermined thickness for spacing said first and second ring member means apart a distance no less than the thickness of the articles to be dispensed, rotation of said body member causing said ring member means to function in sequence to release said articles one at a time while retaining the remainder of said stack.

19. The dispensing means according to claim 19 in which said body member has a necked portion with shoulder at its upper end and said ring member means, respectively, circumscribe said necked portion.

20. The dispensing means according to claim 20 in which said ring member means are held on said body member and against said shoulder as a unit by screw means.

21. The dispensing means according to claim 20 in which said body member is truncated downwardly and outwardly at its upper end to guide said article to and in proper position with said ring member means.

22. Apparatus according to claim 15 having common driving means source with other apparatus whereby said other apparatus and said support means are operated in unison and in timed relation.

23. Apparatus according to claim 16 having common driving means source with other apparatus whereby said other apparatus and said support means are operated in unison and in timed relation.

24. The apparatus according to claim 2 in which each said dispensing means comprises a body member mounted on said support means and a plurality of separate ring members detachably mounted on said body member, a lower said ring member for supporting a stack of articles to be dispensed and rotating in timed sequence to release the lowermost said article, an upper said ring member for entering between the lowermost and penultimate article of the said stack and retaining all of the articles in the stack except the lowermost article when the lowermost article is released by said lower ring member, and at least one spacer ring of predetermined thickness for spacing said lower and upper ring members apart a distance no less than the thickness of the articles to be dispensed, rotation of said body member causing said ring members to function in sequence to release said articles one at a time while retaining the remainder of said articles in the stack.

25. The dispensing means according to claim 18 with a third ring member disposed between said first and second ring members and having knife edge means for entering between said lowermost and penultimate articles and separating them and displacing said lowermost article away from said penultimate article.

References Cited

UNITED STATES PATENTS

| | | | |
|---|---|---|---|
| 1,667,483 | 4/1928 | Leof | 221—222 X |
| 1,722,048 | 7/1929 | Hill | 221—223 |
| 1,963,621 | 6/1934 | Geyer | 221—221 |
| 2,268,421 | 12/1941 | Reifsnyder et al. | 221—222 |
| 2,389,905 | 11/1945 | Harriss et al. | 221—223 X |
| 2,721,002 | 10/1955 | Smith | 221—222 |
| 2,840,963 | 7/1958 | Osmond | 221—222 X |
| 3,057,515 | 10/1962 | Loeser | 221—221 |
| 3,071,292 | 1/1963 | Atwood et al. | 221—223 |
| 3,074,594 | 1/1963 | Cheeley | 221—223 X |
| 3,083,868 | 4/1963 | Mueller | 221—221 X |
| 3,120,324 | 2/1964 | Amberg et al. | 221—221 |
| 3,198,382 | 8/1965 | Cleary | 221—222 |

WALTER SOBIN, *Primary Examiner.*

U.S. Cl. X.R.

221—225, 241